US012458269B2

(12) United States Patent
Buchnik et al.

(10) Patent No.: US 12,458,269 B2
(45) Date of Patent: Nov. 4, 2025

(54) AUTOMATIC DETECTION OF THE HIS BUNDLE DURING ELECTROPHYSIOLOGICAL MAPPING

(71) Applicant: BIOSENSE WEBSTER (ISRAEL) LTD., Yokneam (IL)

(72) Inventors: Yael Buchnik, Adi (IL); Vadim Gliner, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 472 days.

(21) Appl. No.: 17/481,600

(22) Filed: Sep. 22, 2021

(65) Prior Publication Data
US 2023/0087423 A1   Mar. 23, 2023

(51) Int. Cl.
| | |
|---|---|
| *A61B 5/349* | (2021.01) |
| *A61B 5/06* | (2006.01) |
| *A61B 5/283* | (2021.01) |
| *A61B 5/347* | (2021.01) |
| *A61B 5/367* | (2021.01) |

(52) U.S. Cl.
CPC .............. *A61B 5/349* (2021.01); *A61B 5/061* (2013.01); *A61B 5/283* (2021.01); *A61B 5/347* (2021.01); *A61B 5/367* (2021.01)

(58) Field of Classification Search
CPC ....................................................... A61B 5/349
USPC ......................................................... 600/509
See application file for complete search history.

(56) References Cited

U.S. PATENT DOCUMENTS

| | | | |
|---|---|---|---|
| 7,596,412 B1 * | 9/2009 | Kroll .................. | A61B 5/02028 607/18 |
| 8,456,182 B2 | 6/2013 | Bar-Tal et al. | |
| 10,285,647 B2 * | 5/2019 | Razavi ................ | A61B 5/7221 |
| 2015/0317448 A1 * | 11/2015 | Razavi .................. | A61B 5/283 702/19 |

(Continued)

FOREIGN PATENT DOCUMENTS

| | | | |
|---|---|---|---|
| WO | WO-2018195040 A1 * | 10/2018 | ............. A61B 5/287 |
| WO | WO2021078848 A1 | 4/2021 | |

OTHER PUBLICATIONS

European Search report for corresponding EPA No. 22196751.6 dated Mar. 3, 2023.

(Continued)

*Primary Examiner* — Nicole F Johnson

(57) ABSTRACT

A method includes receiving intracardiac electrogram (IEGM) signals measured at a plurality of locations in a region of a heart that contains a His bundle of the heart. The IEGM signals are processed to find respective local activation time (LAT) values. A cluster of the locations is identified at which peaks associated with the LAT values occur later than a defined time. Respective time differences are calculated between times of occurrence of the associated peaks and a reference time. The time differences are compared to a threshold value to retain locations for which the time differences are below the threshold value. The respective IEGM signals are filtered to identify respective high-frequency peaks in the IEGM signals. The high-frequency peaks are cross-corelated to identify a subset of the locations whose high-frequency peaks meet a predefined cross-correlation level. The high-frequency peaks are tagged as His peaks and indicated on a cardiac map.

5 Claims, 4 Drawing Sheets

(56) References Cited

U.S. PATENT DOCUMENTS

2020/0353266 A1 11/2020 Min
2021/0016096 A1 1/2021 Qiao

OTHER PUBLICATIONS

Kuo et al., "Electrophysiologic Significance of Discrete Slow Potentials in Dual Atrioventricular Node Physiology: Implications for Selective Radiofrequency Ablation of Slow Pathway Conduction", American Heart Journal, vol. 131, No. 03, pp. 490-498, Mar. 1, 1996.

* cited by examiner

AUTOMATIC DETECTION OF THE HIS BUNDLE DURING ELECTROPHYSIOLOGICAL MAPPING

FIELD OF THE INVENTION

The present invention relates generally to electrophysiological (EP) mapping, and particularly to detection of the His bundle by EP mapping and to visualization of the detected His bundle on an EP map.

BACKGROUND OF THE INVENTION

Measuring cardiac electrical activity occurring in the His bundle was previously proposed in the patent literature. For example, U.S. Pat. No. 10,285,647 describes a method and system for assigning map points to anatomical segments of a heart. The method and system utilize an intravascular mapping tool configured to be inserted into at least one of the endocardial or epicardial space. The mapping tool is maneuvered to select locations proximate to surfaces of the heart, while collecting map points at the select locations to form a ROI data set. The method and system store the ROI data set in a data storage means and defines apical, basal and circumferential landmarks within the ROI data set. The method and system automatically calculate circumferential and longitudinal segment boundaries, associated with wall segments of the heart, based on the apical, basal and circumferential landmarks. The method and system automatically assign segment identifiers (IDs) to the map points based on locations of the map points relative to the circumferential and longitudinal boundaries, the segment IDs associated with wall segments of the heart. In an optional embodiment, a septal landmark can be used by detecting a His bundle potential along the right ventricle (RV) septum that would indicate the circumferential location of the septal wall.

As another example, International Patent Application Publication WO 2021/078,848 describes an implantable medical device for stimulating a heart, the device comprising a housing, a processor, a memory unit, a stimulation unit configured to stimulate the His bundle of the heart, and a detection unit configured to detect an electrical signal at the His bundle of the same heart.

SUMMARY OF THE INVENTION

An embodiment of the present invention that is described hereinafter provides a method including receiving intracardiac electrogram (IEGM) signals measured at a plurality of locations in a region of a heart that contains a His bundle of the heart. The IEGM signals are processed to find respective local activation time (LAT) values at the plurality of the locations. A cluster of the locations is identified at which peaks in the IEGM signals, associated with the LAT values, occur later than a defined time. For the locations, respective time differences are calculated between times of occurrence of the identified peaks and a reference time. The time differences are compared to a threshold value and retained are the locations for which the time differences are below the threshold value. The IEGM signals measured at the retained locations are filtered to identify respective high-frequency peaks in the IEGM signals. The identified high-frequency peaks are cross corelated to identify a subset of the locations whose high-frequency peaks meet a predefined cross-correlation level. The high-frequency peaks are tagged as His peaks, and indicated on a cardiac map.

In some embodiments, indicating the tagged His peaks includes coloring a His region on the map.

In some embodiments, identifying the cluster includes applying a clustering algorithm.

In an embodiment, the reference time is an end time of a window of interest (WOI) provided by a user.

In another embodiment, filtering the signals includes passing each of the IEGM signals through a high pass filter.

In some embodiments, the IEGMs are acquired using a mapping catheter positioned in a cardiac chamber.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Overview

Figure 1:
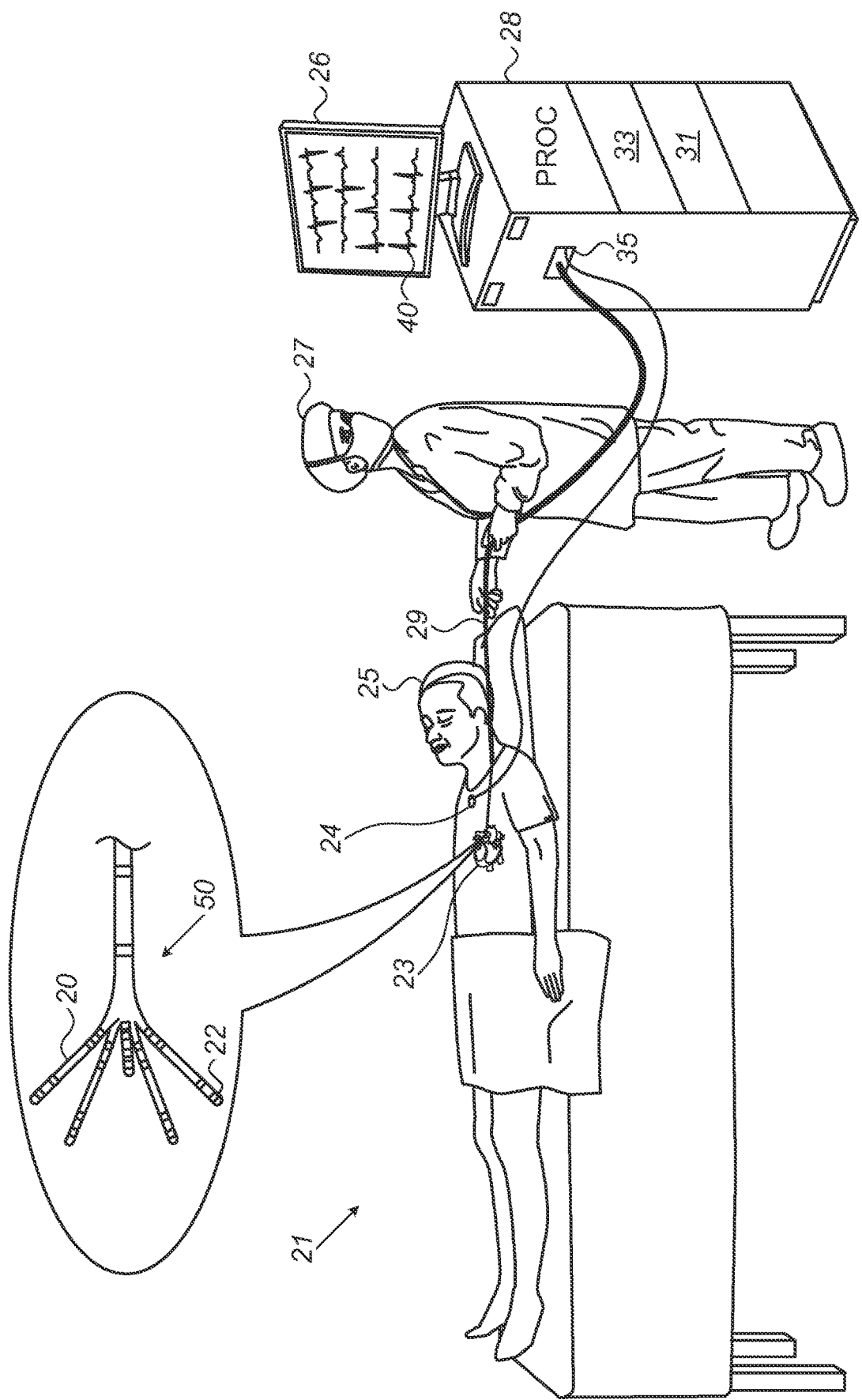
FIG. 1 is a schematic, pictorial illustration of a system for electrophysiological (EP) mapping, in accordance with an exemplary embodiment of the present invention.

Some electrophysiological (EP) disorders, such as cardiac arrhythmia, may be manifested in episodes of irregular EP signals, such as irregular intracardiac electrograms (IEGMs). A multi-electrode catheter may be used to acquire IEGMs to detect a cardiac tissue location causing the irregular IEGMs. After mapping, a physician may ablate detected arrhythmogenic tissue. Often, to generate an accurate EP map of cardiac tissue, a physician may be required to pace the heart from a certain tissue location inside the heart, such as from a vicinity of the His bundle.

Catheter-based EP mapping techniques can produce various types of EP maps of a cardiac chamber, such as the left atrium of a heart. For example, cardiac EP maps, such as a local activation time (LAT) map, a bipolar potential map, or a unipolar potential map, are produced by acquiring IEGMs from locations on a heart chamber surface. EP values, such as LATs (or potentials), are then derived from the IEGMs for the locations. Such locations and respective EP values, called hereafter "data points," are then overlayed, typically as a color, onto a 3D map of the chamber.

The His bundle is part of the Purkinje fibers in the heart, located between the heart chambers. The His bundle is a good place from which to pace, though this area should be avoided for ablation. Therefore, it is important to identify the His bundle on the EP map, e.g., by using a tag.

However, the His bundle is difficult to identify from IEGMs captured in the atrium, as the identifying peak in the electrical signal is very small because the His bundle, which is primarily located in the ventricle, is itself also very small. Therefore, in order to detect a peak that identifies the His bundle, a catheter with many small electrodes is needed to capture accurate signals. Small electrodes for accuracy of the signals, and many electrodes to make sure that the catheter has a good chance of having some of its electrodes in the region of the His bundle. It is still very difficult for a physician to detect the His bundle from the IEGMs, due to the very small peak and the many IEGM signals to examine per catheter position.

Embodiments of the present invention that are described hereinafter provide an automatic His bundle-detection algorithm that is based on IEGMs collected by a multi-electrode catheter (e.g., a multi-arm catheter or a basket catheter), a created LAT map, and a window of interest (WOI) defined by the physician according to the atrial mapping of the atrium.

The disclosed algorithm relies on the fact that the peak due to the His bundle generally appears very late in the WOI, and is seen on a LAT map as a late activation color-coded region, as shown below. The His bundle is also generally surrounded by a tissue area that produces relatively early activations. It should be noted that such a region of late activation on the LAT map does not always mean that the region is the His bundle. Instead, it indicates that the region is a candidate for being considered as the His bundle, subject to further tests described below.

The disclosed method to detect the His bundle therefore includes the following algorithm steps:

1. Data points from the LAT map located in and around the candidate late activation region are segmented, based on annotation time. This segmentation may be performed, for example, using a clustering algorithm (e.g., k-means) to find a subset of data points possibly indicative of the His bundle. The subset is chosen to include only points very late in the WOI and to separate them from points earlier in the WOI.
2. Quantitively, a candidate peak needs further to have a time of occurrence that is late enough in the WOI, with a time difference relative to the WOI end, $\Delta T=$ (WOI_end_timing-peak timing), satisfying a condition, $\Delta T<$threshold, such as $\Delta T<30$ mSec.

Note, however, such late activation within the WOI is still not necessarily indicative of His tissue.

3. Each signal among the data points in the selected cluster is passed through a high-pass filter (e.g., a filter with a passband above 200 Hz) to leave only narrow sharp peaks, which could be indicative of an His bundle peak.
4. A peak detector algorithm is applied to each filtered signal to detect peaks above a certain limit (e.g., above 30 microvolts), to eliminate irrelevant sharp peaks, such as arising from far-field noise. Note, another method may be used to differentiate actual signal from noise, such one the uses the waveform derivative.
5. A processor calculates a mean time and standard deviation (SD) of the peaks remaining after step 4.
6. The processor eliminates sharp peaks that are outliers, e.g., eliminates all peaks deviating from the mean by more than $3\sigma$.
7. The processor then calculates a normalized cross correlation between all remaining peaks to make sure that they represent the same activity. If the correlation coefficient for a given signal is above a given value C, such as C=0.75, the processor tags the signal as His Signals.
8. Finally the processor codes (e.g., colors) the EP map with distinctive pattern (e.g., color) for the region associated with the His tagged peaks (i.e., with LAT values of respective His peaks).

In an exemplary embodiment, a system is provided that includes an interface and a processor. The interface is configured to receive intracardiac electrogram (IEGM) signals measured at a plurality of locations in a region of a heart that contains a His bundle of the heart. The processor processes the IEGM signals to find respective local activation time (LAT) values at the plurality of the locations. The processor then identifies a cluster of the locations at which peaks in the IEGM signals, associated with the LAT values, occur later than a defined time. For the locations in the identified cluster, the processor calculates respective time differences between times of occurrence of the identified peaks and a reference time. Next, the processor compares the time differences to a threshold value and retains the locations for which the time differences are below the threshold value. The processor filters the IEGM signals measured at the retained locations to identify respective high-frequency peaks in the IEGM signals. Next, the processor cross correlates the identified high-frequency peaks, and identifies a subset of the locations whose high-frequency peaks meet a predefined cross-correlation level. The processor tags the high-frequency peaks corresponding to the locations in the subset as His peaks, and, finally, indicates the tagged His peaks on a map of at least a portion of the heart.

By providing automated His bundle detection and tagging during EP mapping, catheter-based diagnostic and/or therapeutic (e.g., ablative) procedures can be made safer and more effective.

SYSTEM DESCRIPTION

FIG. 1 is a schematic, pictorial illustration of a system 21 for electrophysiological (EP) mapping, in accordance with an exemplary embodiment of the present invention. FIG. 1 depicts a physician 27 using an EP mapping catheter 29 to perform an EP mapping of a cardiac chamber (e.g., a left atrium (LA) and/or a right atrium (RA) and/or a left ventricle (LV), and/or a right ventricle (RV)) of a heart 23 of a patient 25.

Catheter 29 comprises, at its distal end, an electrode array 50 comprising one or more arms 20, with mapping-electrodes 22 disposed along each of the arms. During the EP mapping procedure, electrodes 22 acquire and/or inject signals from and/or to the tissue of heart 23. In particular, electrodes 22 acquire IEGMs, such as atrial electrograms.

The respective locations of mapping-electrodes 22 inside heart 23 (i.e., where the IEGMs are measured) are tracked as well, so that a processor 28 may link each acquired IEGM with the location at which the signal was acquired. System 20 externally senses electrical position signals and EP data, such as electrocardiograms (ECG), using a plurality of external electrodes 24 coupled to the body surface of patient 25; for simplicity, three external electrodes 24 may be coupled to the patient's chest, and another three external electrodes may be coupled to the patient's back. For ease of illustration, only one external electrode is shown in FIG. 1.

An example of a system capable of using the sensed electrical position signals to track the locations of mapping-electrodes 22 inside heart 23 of the patient is the CARTO®

3 system (produced by Biosense Webster Inc., Irvine, Calif.). The CARTO® 3 system uses a tracking method named Advanced Current Location (ACL), which is described in detail in U.S. Pat. No. 8,456,182, whose disclosure is incorporated herein by reference. According to this method, processor 28 measures the electrical impedance between each of at least some of mapping-electrodes 22 and each of external electrodes 24 and finds location coordinates of the mapping-electrodes using these impedances. Alternatively or additionally, system 21 may apply other methods of position sensing that are known in the art, such as magnetic position sensing, in finding these location coordinates.

The IEGMs captured by mapping-electrodes 22 are conveyed over a wire link (not shown) that runs through catheter 29 to a data acquisition module 33 via an electrical interface 35. Using the sensed positions to establish spatiotemporal correlations between the electrograms, processor 28 of system 21 generates an EP map, such as an LAT map. The processor stores the EP map in a memory 31. In parallel, processor 28 may present electrogram traces 40 on a display 26 of system 20.

The example illustration shown in FIG. 1 is chosen purely for the sake of conceptual clarity. Other types of multi-electrode sensing geometries, such as of the Lasso® catheter (produced by Biosense Webster), may also be employed. Additionally, contact sensors may be fitted at the distal end of catheter 29 to transmit data indicative of the physical quality of electrode contact with tissue. In an embodiment, measurements of some electrodes 22 may be discarded because their physical contact quality is poor, and the measurements of other electrodes may be regarded as valid because their contact quality is high.

Although exemplary embodiments of the present invention are described above, for the sake of concreteness and clarity, with specific reference to the elements of system 21, the principles of the present invention may similarly be applied in other EP mapping systems with suitable sensing capabilities. All such alternative embodiments are considered to be within the scope of the present invention.

Processor 28 typically comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. In particular, processor 28 runs a dedicated algorithm that enables processor 28 to perform the steps described in FIG. 5.

Ep Mapping of his Bundle

Figure 2:
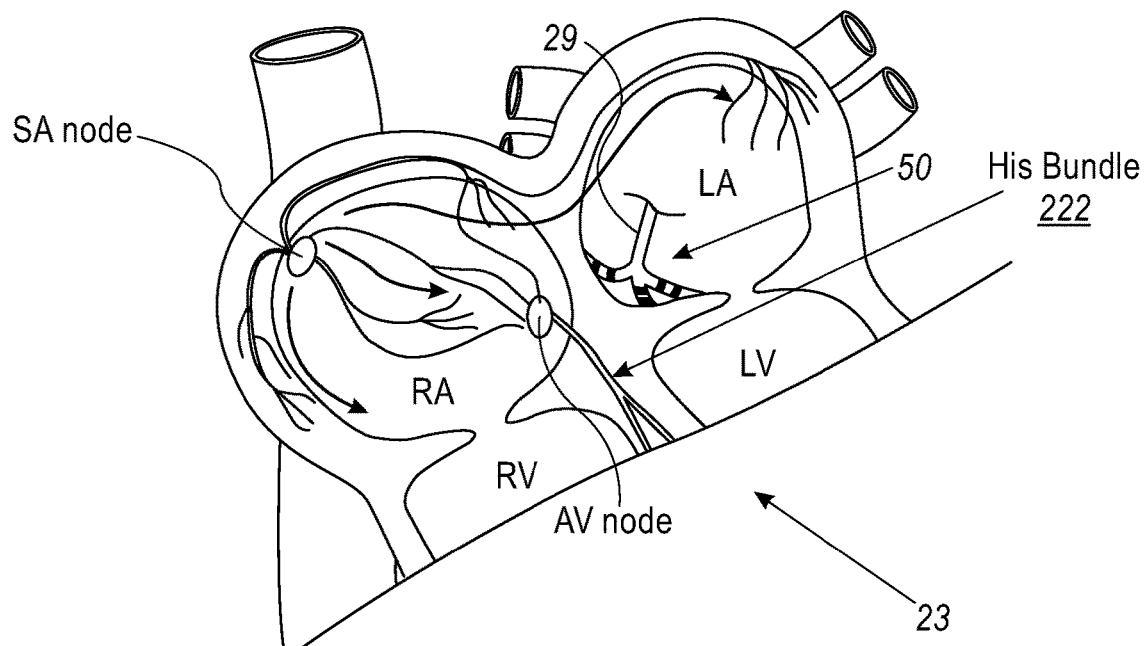
FIG. 2 is a schematic, pictorial illustration of a heart with a His bundle that is EP mapped by the system of FIG. 1, in accordance with an exemplary embodiment of the present invention.

FIG. 2 is a schematic, pictorial illustration of heart 23 with a His bundle 222, which is mapped by system 21 of FIG. 1, in accordance with an exemplary embodiment of the present invention. To perform such mapping, EP mapping catheter 29 is positioned inside the left atrium (LA). Mapping-electrodes 22 in array 50 are pressed against tissue in the vicinity of His bundle 222 to acquire EP signals (e.g., IEGMs) that might be propagating in His bundle 222. An example of such an IEGM signal is shown in FIG. 3.

Figure 3:
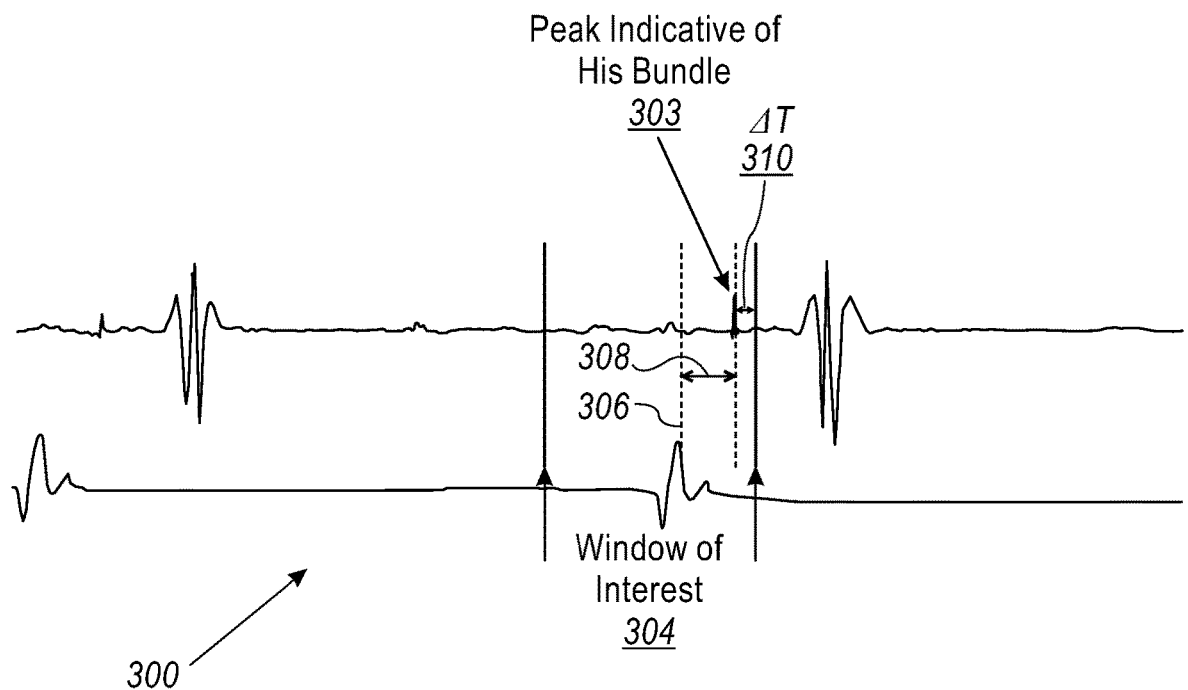
FIG. 3 is a graph of an intracardiac electrogram (IEGM) signal acquired by the system of FIG. 1, the IEGM comprising a peak indicative of the His bundle, in accordance with an exemplary embodiment of the present invention.

FIG. 3 is a graph of an intracardiac electrogram (IEGM) signal 300 acquired by system 21 of FIG. 1, with a peak 303 indicative of His bundle 222, in accordance with an embodiment of the present invention. Peak 303 is already received annotated, indicating the time of occurrence of peak 303 relative to a predefined reference annotation 306. In the shown embodiment, the respective time difference 308 is a LAT value of peak 303 to be used in a His-indicative LAT map, if peak 303 is found to be a His peak.

Processor 28 uses the aforementioned automatic His bundle detection algorithm to detect the His bundle signal within a temporal window of interest (WOI) 304, which is defined by the physician on the basis of atrial mapping. Additionally, or alternatively, processor 28 may be programmed to set the bounds of WOI 304 automatically.

As seen, peak 303, which identifies His bundle 222, appears late in WOI 304. The disclosed method to detect the His bundle includes finding a subset of data points, such as peak 303 and a respective tissue location of the signal, in order to identify only those data points that occur this late in the WOI and to separate them from points earlier in the WOI.

As peak 303 is narrow, processor 28 can distinguish the peak by passing signal 300 through a high pass filter (e.g., above 200 Hz) to leave only narrow sharp peaks, which could be indicative of the His bundle peak.

A peak detection algorithm used by processor 28 is applied to each filtered signal to detect peaks above a certain limit (e.g., above 30 microvolts). Peak detection may be carried out, for example, using smoothing and then fitting a known function (e.g., a polynomial) to the waveform. Alternatively, processor 28 can match a known peak shape to the waveform. Further alternatively, peaks and troughs can be detected by finding zero-crossings (i.e., local maxima) in the differences (slope sign change) between a point and its neighbors.

Any suitable peak detection algorithm that is known in the art may be used for this purpose, including amplitude-based and gradient-based algorithms. Reference annotation 306 may be identified, for example, on the basis of a peak in a body-surface electrocardiogram or an IEGM signal captured at a reference location within heart 23.

Processor 28 calculates a time difference $\Delta T$ 310 between peak 303 and end boundary of WOI 304. If $\Delta T$<threshold, processor 28 tags peak 303 on an EP map, such as the EP map shown in and described with respect to FIG. 4 below, to indicate that the identification of the His bundle is based on the location of EP peak signal 303. For example, if the time of occurrence of peak 303 is late enough (e.g., within 20-50 ms of the end of the WOI and the peak width 303 is small enough (e.g., less than 20 ms), processor 28 assumes that the data point represented by signal 303 originates from the His bundle (up to passing the aforementioned cross correlation test). A tag is then added by the processor to the EP map, (such as the map shown in FIG. 4 below) to indicate that the identification of the His bundle is based on the location of EP peak signal 303.

Figure 4:
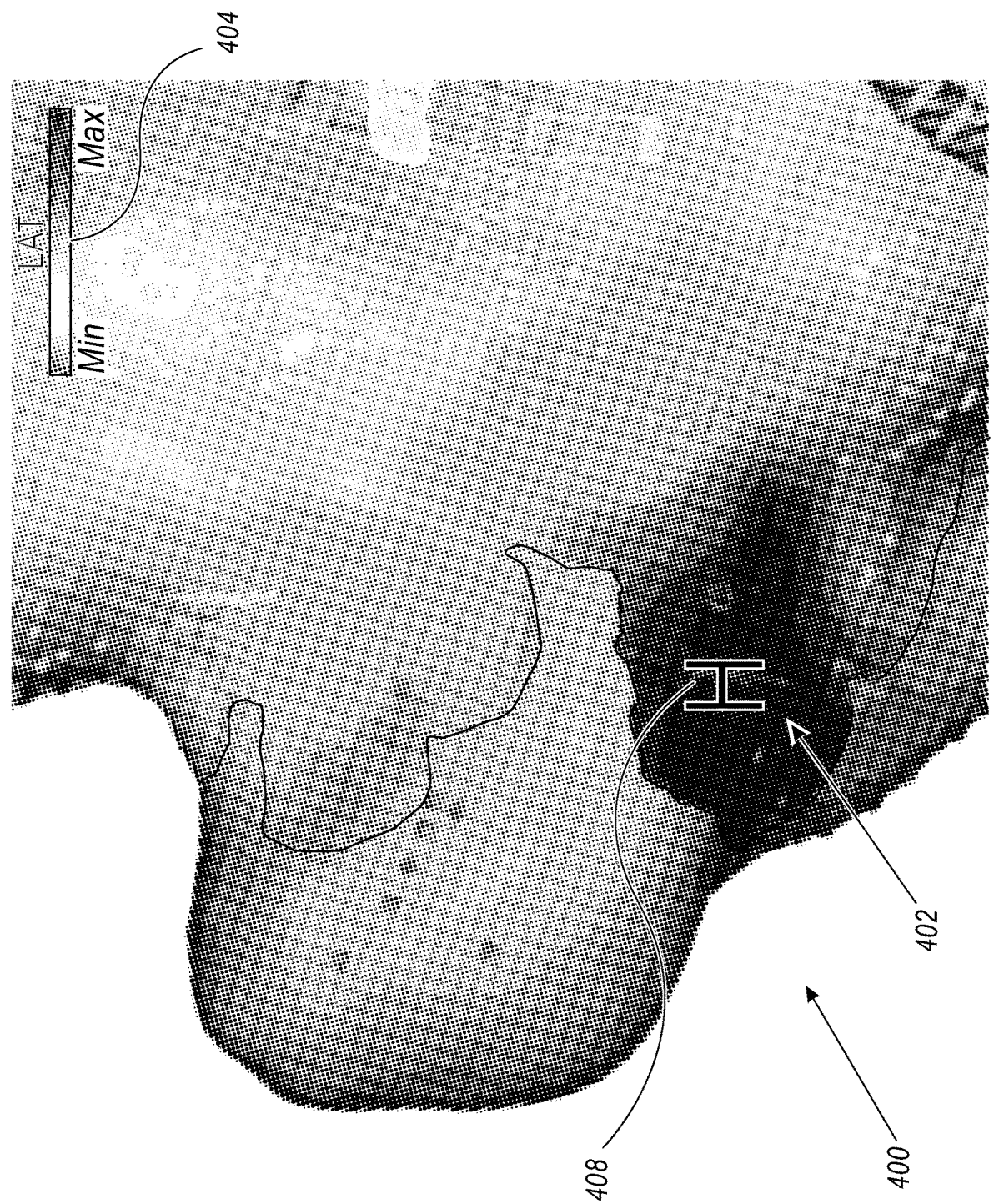
FIG. 4 is a schematic, pictorial illustration of an EP map of the heart generated by the system of FIG. 1, the EP map comprising a representation of the His bundle region, in accordance with an exemplary embodiment of the present invention.

FIG. 4 is a schematic, pictorial illustration of an EP map 400 of heart 23 generated by system 21 (FIG. 1) and comprising a region 402 containing the His bundle 222, in accordance with an exemplary embodiment of the present invention. As seen using LAT scale 404, region 402 is characterized by long LAT values and is surrounded, at least in part, by cardiac tissue areas with short LAT values. Processor 28 marks region 402 in EP map 400 with an indication 408 (e.g., a letter "H"). Alternatively, or additionally, the processor colors the region with a particular color.

Method of Automatic Detection of his Bundle During Electrophysiological Mapping

Figure 5:
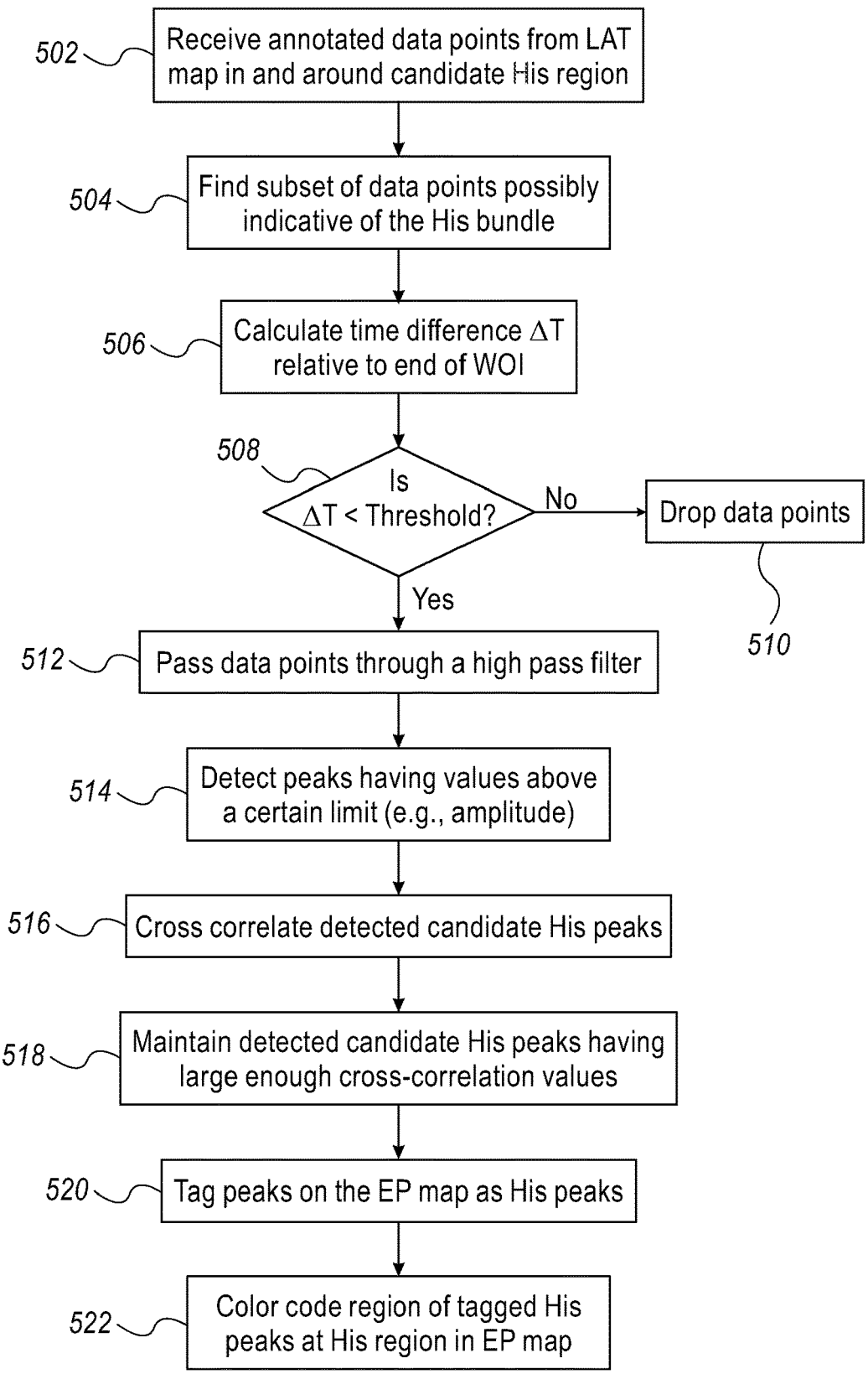
FIG. 5 is a flow chart that schematically illustrates a method for automatic detection and tagging of the His bundle, in accordance with an exemplary embodiment of the present invention.

FIG. 5 is a flow chart that schematically illustrates a method for automatic detection and tagging of the His bundle 222, in accordance with an exemplary embodiment of the present invention. The algorithm, according to the presented exemplary embodiment, carries out a process that begins at a LAT data points receiving step 502, in which processor 28 receives time annotated data points located in and around the candidate late activation region 402 in LAT map 400 (FIG. 4).

At a segmentation step 504, processor 28 segments the received data points based on the respective annotation times using a clustering algorithm (e.g., k-means) to find a subset of the data points that may be indicative of the His bundle.

At a timing calculation step 506, processor 28 then calculates time difference, $\Delta T$, between candidate His peaks and the end of WOI 304. In a comparison step 508, processor 28 compares $\Delta T$ to a threshold value. If $\Delta T$ threshold, (i.e., a NO answer) processor 28 drops each of such irrelevant data point, at a data-points dropping step 510.

The rest of data-points go through a filtration step 512, in which processor 28 passes each IEGM signal of the data points through a high-pass filter (e.g., above 200 Hz) to leave only narrow sharp peaks, which could be indicative of the His bundle peak.

Next, at a His peak detection step 514, processor 28 applies a peak detector algorithm to each filtered signal to detect peaks above a certain limit (e.g., above 30 microvolts).

At a cross-correlation step 516, processor 29 cross correlates all remining candidate His peaks to make sure that they represent the same electrical activity. The processor maintains, at a step 518, only peaks with large enough cross correlation coefficient, C, as described above.

Next, at a tagging step 520, processor 28 tags the found His peaks on the EP map, to indicate that the His bundle is based on the location of EP peak signal 303.

Finally, processor 28 colors the His region on the EP map as shown in FIG. 4, at a His region coloring step 522.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

We claim:

1. A system, comprising:
   an interface configured to receive intracardiac electrogram (IEGM) signals measured at a plurality of locations in a region of a heart that contains a His bundle of the heart, wherein the IEGMs are acquired using a mapping catheter positioned in a cardiac chamber; and
   a processor, which is configured to:
      process the IEGM signals to find respective local activation time (LAT) values at the plurality of the locations;
      identify a cluster of the locations at which peaks in the IEGM signals, associated with the LAT values, occur later than a defined time;
      for the locations in the identified cluster, calculate respective time differences between times of occurrence of the identified peaks and a reference time;
      compare the time differences to a threshold value and retain the locations for which the time differences are below the threshold value;
      filter the IEGM signals measured at the retained locations to identify respective high-frequency peaks in the IEGM signals;
      calculate a normalized cross correlation coefficient for the identified high-frequency peaks, and identify a subset of the locations whose high-frequency peaks have a cross correlation coefficient that meets a predefined cross-correlation level;
      tag the high-frequency peaks corresponding to the locations in the subset as His peaks;
      generate an electrophysiological (EP) map of at least a portion of the region of a heart; and
      indicate the tagged His peaks on the EP map of at least a portion of the region of the heart.

2. The system according to claim 1, wherein the processor is configured to indicate the tagged His peaks by coloring a His region on the map.

3. The system according to claim 1, wherein the processor is configured to identify the cluster by applying a clustering algorithm.

4. The system according to claim 1, wherein the reference time is an end time of a window of interest (WOI) provided by a user.

5. The system according to claim 1, wherein the processor is configured to filter the signals by passing each of the IEGM signals through a high pass filter.

* * * * *